United States Patent [19]

Judd

[11] 4,017,913
[45] Apr. 19, 1977

[54] SELF-ALIGNING VALVE ASSEMBLY

[75] Inventor: Ronald Iliff Judd, Anaheim, Calif.

[73] Assignee: McDonnell Douglas Corporation, Long Beach, Calif.

[22] Filed: Sept. 18, 1975

[21] Appl. No.: 614,529

[52] U.S. Cl. .......................................... 4/52; 4/60; 4/67 R; 251/144; 251/294
[51] Int. Cl.² .......................................... E03D 1/34
[58] Field of Search ................. 4/56, 60, 57 R, 52, 4/67 R, 58, 67 A; 251/144, 294, 335

[56] References Cited
UNITED STATES PATENTS

| 737,941 | 9/1909 | Leithauser | 251/144 X |
| 1,458,816 | 6/1923 | Fyke et al. | 251/144 |
| 2,436,035 | 2/1948 | Cheiten | 4/56 |
| 2,788,525 | 4/1957 | Reichert | 4/56 |
| 2,849,725 | 9/1958 | Armstrong et al. | 4/67 R |
| 3,383,711 | 5/1968 | Swanson | 4/56 |
| 3,447,777 | 6/1969 | Carlson | 251/144 |
| 3,448,771 | 6/1969 | Bales, Jr. et al. | 251/294 X |
| 3,890,652 | 6/1975 | Fulton | 4/58 |

*Primary Examiner*—Henry K. Artis
*Attorney, Agent, or Firm*—John P. Scholl; Walter J. Jason; Donald L. Royer

[57] ABSTRACT

A valve assembly for use on the inside of an enclosed water receptacle or toilet. The valve assembly incorporates a circular valve plug with spherical seating surface to close a drain hole from the inside of the waste receptacle. A helical spring and telescoping alignment tubes urge the plug into the drain hole. A spherical joint is formed between the plug and the tubes and assists in the alignment of the plug with the drain hole. The center of rotation of the spherical joint and the spherical contact surface of said joint are located on the outside of the waste receptacle when the valve plug has engaged the edge of the drain hole.

4 Claims, 5 Drawing Figures

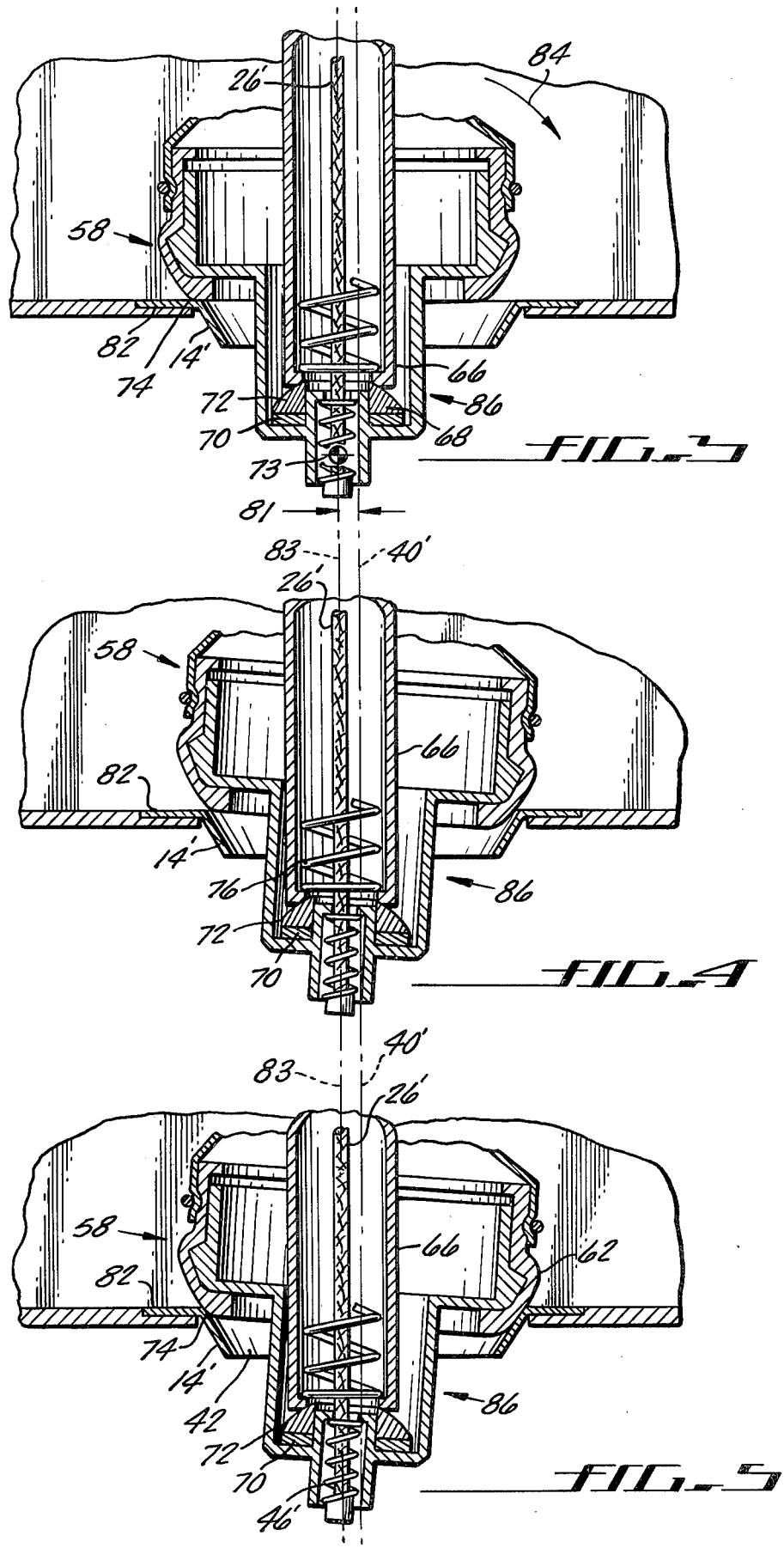

SELF-ALIGNING VALVE ASSEMBLY

BACKGROUND OF THE PRESENT INVENTION

The valve assembly of the present invention has particular application as a closure device for use inside of an enclosed container as, for example, a waste receptacle in aircraft.

The prior art valve assemblies used in waste receptacles have been supported from the top of the receptacle and protrude into a valve seat in the bottom of the receptacle. The axial alignment of the valve plug with the valve seat has been controlled by telescoping tubes. The valve plug was inserted into and held in the valve seat by a helically coiled spring which was enclosed by the telescoping tubes and was compressed between the valve plug and the support structure. In the construction of the waste receptacle, in the installation of the valve assembly, and in the operation of the valve assembly, errors in axial alignment of the valve plug and valve seat have been encountered. In the prior art valve assemblies when an error in axial alignment was introduced into the system the valve plug would hang up on the valve seat and leave an opening through which the contents of the receptacle could pass.

When the prior art valves in the aircraft waste receptacle leaked, the contents of the receptacle escaped, creating a difficult and distasteful clean-up job for the aircraft maintenance personnel. In some instances the leakage has presented a danger to the operation of the aircraft due to the formation of ice.

SUMMARY OF THE PRESENT INVENTION

The present invention overcomes the deficiencies of the prior art by incorporation of a spherical joint between the tapered valve plug and the telescoping alignment tubes, positioning the center of rotation of such joint on the outlet side of the tapered valve seat, and by also positioning the spherical contact surface of such point, (e.g., the locus of application of the compressive spring force on the valve plug) on the outlet side of the valve seat when the valve plug has engaged the valve seat.

When the valve plug of the inventive valve assembly is misaligned axially with the valve seat and encounters the lip of the valve seat, the spherical joint permits the valve plug to rotate into the seat and slide into full engagement with the valve seat closing the drain hole defined by the valve seat.

A principal object of the present invention is to provide a valve assembly which will permit seating of a spherical valve plug in a valve seat even though the valve plug is axially misaligned.

Another object of the present invention is to provide a simple, inexpensive fix for the prior art valves.

An advantage of the present inventive valve assembly over the prior art valve assemblies is that the inventive valve assembly will seat properly when there is axial misalignment between the valve plug and the valve seat.

Another advantage of the present system is that some waste receptacles of current manufacture which could not be fitted successfully with operating valves of the prior art can be utilized with the improved valve assembly.

BRIEF DESCRIPTION OF THE DRAWINGS

FIG. 3 is a partial vertical sectional view through the valve assembly of the present invention with the valve plug engaging the lip of the valve seat;

FIG. 4 is a partial sectional view through the valve assembly shown in FIG. 3 with the valve plug cocked in the valve seat after rotation from the position as shown in FIG. 3; and FIG. 5 is a partial sectional view of the valve assembly of FIG. 3 and FIG. 4 after the valve plug has slid into full engagement with the valve seat.

DETAILED DESCRIPTION OF ILLUSTRATIVE EMBODIMENT

Figure 1:
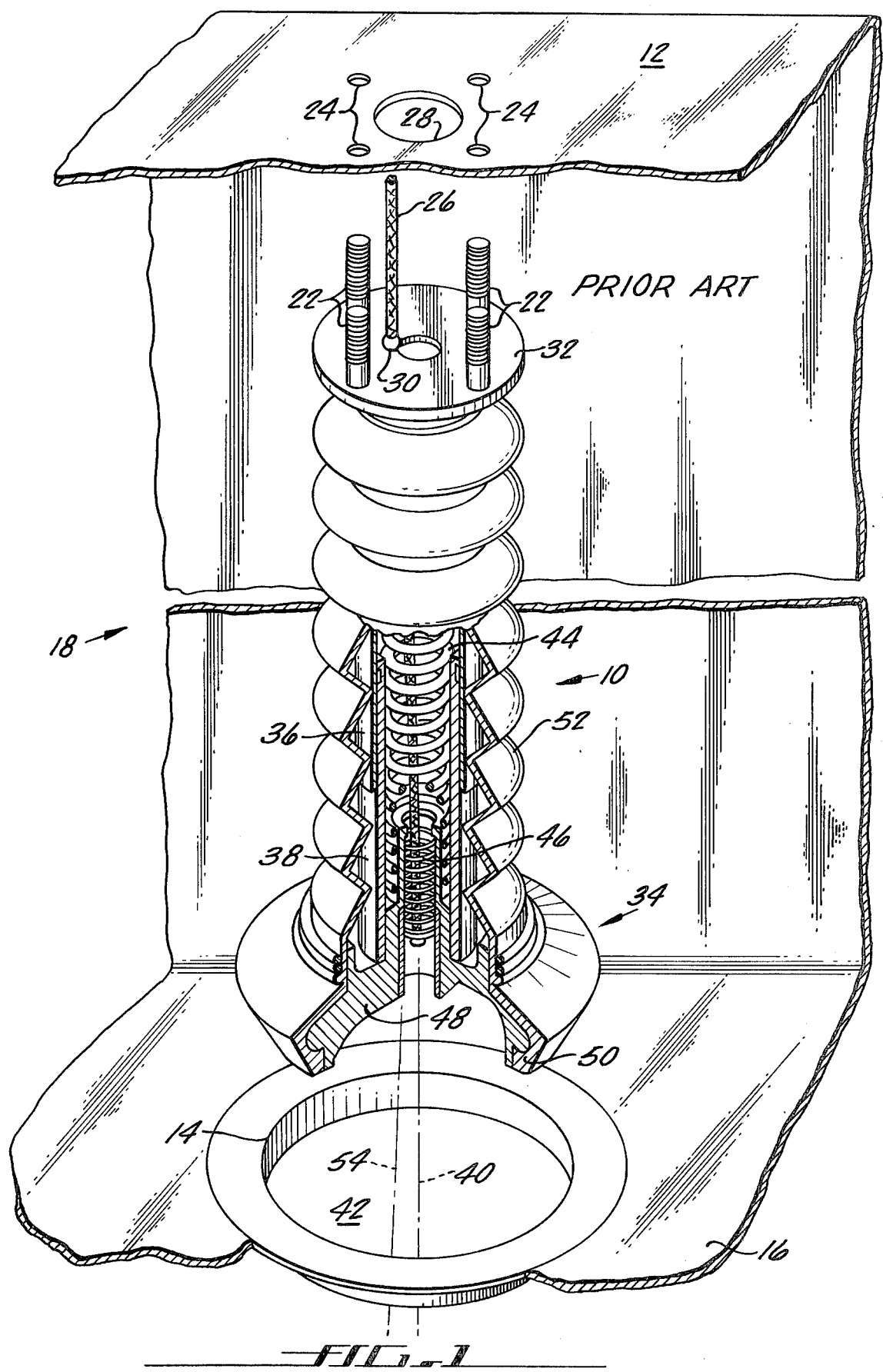
FIG. 1 is a perspective cutaway view of a container with a prior art valve assembly suspended between top and the bottom of a waste receptacle.

Referring to FIG. 1, a prior art drain valve assembly 10 is shown suspended between the top of the enclosed container (or receptacle) 12 and the annular valve seat 14 located in the bottom of the container 16. The valve assembly 10 as shown in FIG. 1 is in the compressed position for installation in a waste receptacle 18. FIG. 1 shows only a portion of one wall 20 of the waste receptacle 18 together with portions of the top 12 and bottom 16 of the receptacle.

To mount the valve assembly 10 within the receptacle 18, bolts 22 are passed through holes 24 in top 12 and affixed in position by conventional nuts (not shown).

When the valve assembly 10 is affixed in position, the actuator cable 26 passes through hole 28 in top of the container 12. In order to release the valve assembly 10 from the compressed position, cable 26 is moved into the center of hole 28 and restraining bead 30 is moved out of its detent in support flange 32. When cable 26 is released, circular valve plug 34 is guided toward valve seat 14 by telescoping tubes (36 and 38). If valve plug 34 is axially aligned with the centerline 40 of valve seat 14, the plug 34 will enter the valve seat 14 and close drain hole 42 of the waste receptacle 18.

The valve assembly 10 contains two springs, a heavy actuator spring 44 and a light cable tensioning spring 46. The actuator spring 44 requires approximately 40 pounds of force to be fully compressed. The cable tensioning spring 46 requires approximately 5 pounds of force to be fully compressed.

When the valve assembly 10 is in the closed position (not shown) actuator spring 44 is compressed between valve plug 34 and support flange 32. In the closed position the compressive force of helical coiled spring 44 on valve plug 34 holds the plug in the valve seat and prevents fluids from waste receptacle 18 from passing through drain hole 42.

The purpose of cable tensioning spring 46 is to remove the slack from cable 26 when the valve assembly is installed and the valve plug is in the closed position. Cable 26 connects the maintenance dump handle (not shown) with the valve assembly.

In the normal operation of the valve assembly, aircraft maintenance personnel pull the dump handle (not shown) which moves cable 26 to compress the cable tensioning spring 46. When the cable tensioning spring 46 is completely compressed in core 48 the cable 26 pulls against the compressive force of the actuator spring 44 and telescoping tubes 36 and 38 contract and valve plug 34 unseats and moves vertically to open drain hole 42.

When receptacle 18 is emptied, the dump handle (not shown) is released which in turn permits cable 26 to move and actuator spring to urge valve plug toward drain hole 42. Telescoping guide tubes 36 and 38 are designed to direct plug 34 into the proper position in valve seat 14.

Valve plug 34 is composed of two pieces, an inner core 48 made of aluminum or plastic to give shape and strength to the valve plug and an outer cover 50 made of rubber or other resilient material for sealing purposes.

Surrounding the telescoping tubes 36 and 38 is an expandable rubber ribbed boot 52 which protects the tubes 36 and 38 and actuator spring 44 from the contents of the waste receptacle.

In the past, errors in axial alignment of the valve assembly 10 and the valve seat 14 have been introduced into the system as a result of defects in the manufacturing of the waste receptacle, errors in installation of the valve assembly, and by deflection or distortion of the receptacle top in the operation of the valve assembly itself. When the valve plug was out of axial alignment as shown by line 54, the valve plug engaged the side of valve seat 14 and would hang up on the valve seat 14 and leave a crescent-shaped opening through drain hole 42.

Figure 2:
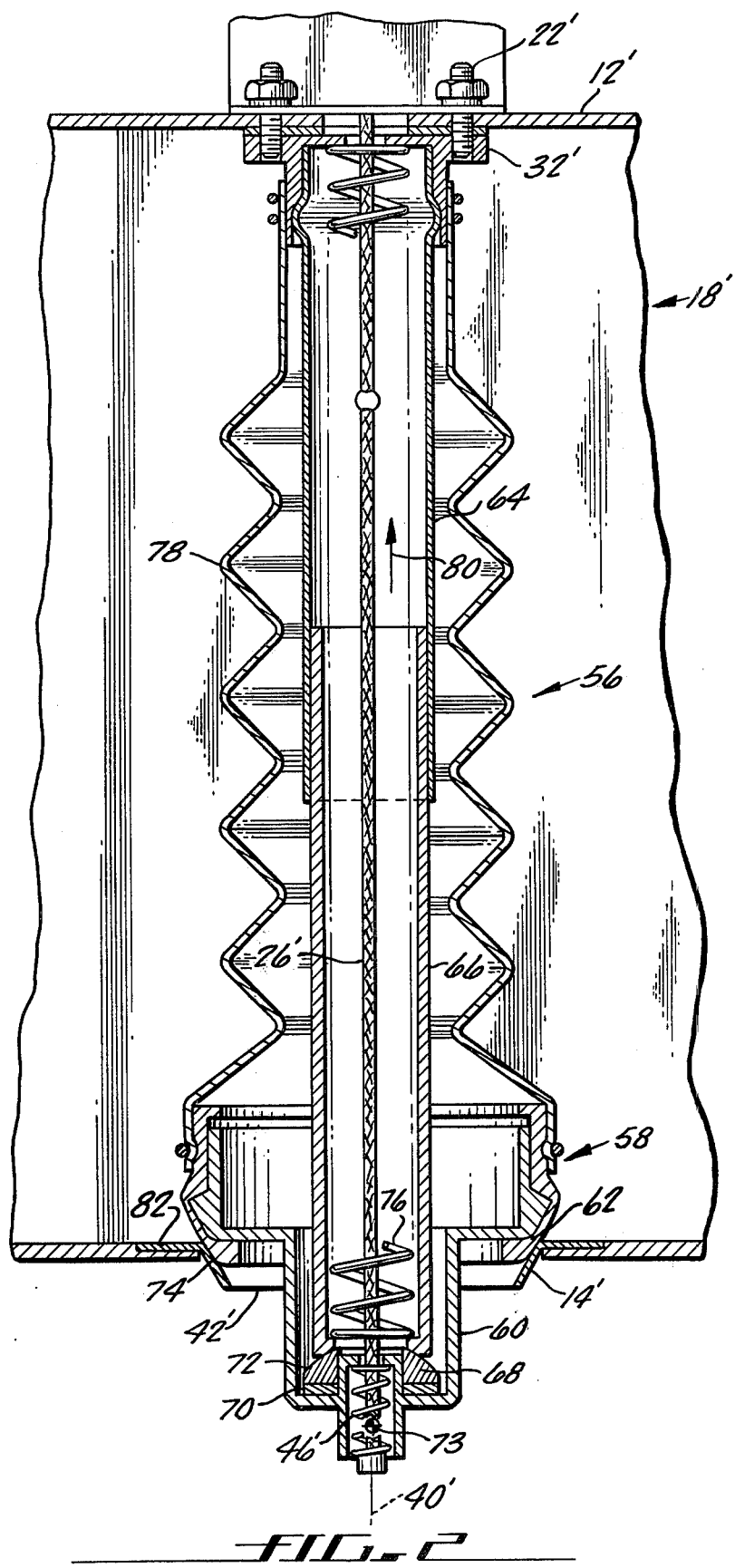
FIG. 2 is a vertical sectional view through a valve assembly constructed in accordance with the present invention.

The purpose of the inventive drain valve assembly as shown in FIG. 2 is to overcome the misalignment errors introduced into the system as previously described and assist the valve plug in properly seating in valve seat.

FIG. 2 depicts a drain valve assembly 56 constructed in accordance with the present invention. The valve assembly is mounted in an enclosed waste receptacle 18' by bolts 22' which hold support structure (flange) 32' to the top 12' of the receptacle. Telescoping guide tubes 64 and 66 engage support flange 32' and hold improved plug 58 in approximate alignment with centerline 40' of valve seat 14'. The improved plug 58 is shown engaging the valve seat 14' to close drain hole or annulus 42'.

Plug 58 is constructed of an inner core 60 and an outer resilient cover 62. Plug 58 has a spherical sealing surface defined by the spherical resilient cover 62. Plug 58 is connected to telescoping tube 66 through spherical-shaped ring member 68 which rests on a shock washer 70 inside of inner core 60. The inventive valve plug can swivel or roll on spherical contact surface 72 at the intersection where lower tube 66 engages ring member 68. The center of rotation 73 of the spherical contact surface 72 is located below the valve contact surface 74 (between valve plug 58 and valve seat 14'). Core 60 and spherical ring member 68 may be integrated into a single element by the elimination of shock washer 70.

The shock washer 70 has been provided between spherical ring member 68 and core 60 to absorb any impact shock on the valve assembly when plug 58 hits valve seat 14' upon the release of the dump handle by the maintenance personnel.

Lower telescoping tube 66 slides in and out of upper telescoping tube 64 to maintain valve plug in approximate axial alignment with the center of drain hole 40'. Actuator spring 76 provides the compressive force to urge drain plug 58 toward valve seat 14' and hold it in sealing contact with the valve seat 14'. Cable tensioning spring 46' and cable 26' perform the same function as spring 46 and cable 26 in the prior art spring shown in FIG. 1. Enlarged boot 78 protects the telescoping tubes 64 and 66 and actuator spring 76.

The inner core 60 of improved plug 58 has been modified to increase the depth of plug 58 over prior art valve plug 34 and locate the locus of application of closing force between telescoping tube 66 and spherical ring member 68 below the contact surface 74 of the valve plug 58 and the valve seat 14' when the plug 58 has engaged the lip 82 of the valve seat 14'.

In operation, aircraft maintenance personnel pull the dump handle (not shown) which moves cable 26' vertically in direction indicated by arrow 80 to compress tensioning spring 46'. When spring 46' is compressed, additional movement of the dump handle compresses actuator spring 76 and lifts valve plug 58 out of valve seat 14' opening drain hole 42'.

When waste receptacle 18' is empty the maintenance personnel release the dump handle which permits cable 26' to move in the opposite direction of arrow 80. Telescoping tubes 64 and 66 guide the inventive valve plug 58 toward the valve seat into approximate axial alignment with valve seat 14'. If the valve plug 58 is properly aligned with valve seat 14' the plug 58 seals drain hole 42'.

In FIG. 3 valve plug 58 is misaligned with valve seat 14' and has engaged the lip 82 of valve seat 14'. The misalignment 81 is represented by the distance between centerline 40' of valve seat 14 and centerline 83 of tube 66. When the plug 58 engages the lip 82 of valve seat 14', it rotates in an arc as shown by arrow 84.

The improved valve plug can rotate in the direction of arc 84 from the position shown in FIG. 3 to the position shown in FIG. 4 because of spherical joint 86 between tube 66 and spherical ring member 68.

When the valve plug 58 is in the position as shown in FIG. 4, the compressive force of helical actuator spring 76 on the base of lower tube 66, through spherical joint 86, and upon plug 58 assists plug 58 to slide on the valve seat 14' into the full seating contact position shown in FIG. 5.

The location of the application of the compressive spring force on the valve plug (the spherical contact surface 72 of FIG. 3) below the plane of the valve contact surface 74 insures that the point of rotation of the valve plug will always be below the plane of the valve contact surface 74 even in the event the design limitations of the spherical joint are exceeded and the plug rotates about a point on the spherical contact surface 72 rather than the center of rotation of the joint (73 of FIG. 3).

The use of a spherical surfaced plug in conjunction with the spherical joint permits perfect alignment between the valve plug and valve seat within the limits of rotation of the plug.

While certain exemplary embodiments of this invention have been described above and shown in the accompanying drawings, it is to be understood that such embodiments are merely illustrative of, and not restrictive on, the broad invention and that I do not desire to be limited in my invention to the specific constructions or arrangements shown and described, since various other obvious modifications may occur to persons having ordinary skill in the art and it is to be understood that those modifications are to be construed as part of the present invention.

What is claimed is:

1. A valve assembly for use inside of an enclosed container comprising:
   a support structure capable of being mounted on the inside of the container opposite of an annulus defining a drain hole, said drain hole having an inlet side and an outlet side;
   telescoping alignment tubes engaging said structure;
   a spherical ring member engaging said tubes on the end opposite said support structure to provide a spherical joint, said spherical joint having a center of rotation and a spherical contact surface;
   a circular valve plug with spherical sealing surface attached to said ring member;
   a compressible helical spring in axial alignment with said telescoping tubes to urge said plug into said drain hole;
   the location of said contact surface between the spherical ring member and telescoping alignment tubes and the location of the center of rotation of said spherical joint being on the outside of said drain hole when said plug has engaged said annulus.

2. A valve assembly comprising:
   an annulus defining a drain hole, said annulus having an inlet side and an outlet side;
   a valve plug having a spherical sealing surface located on said inlet side of said annulus adapted to engage the inlet side of said annulus to close said drain hole, and a spherical contact surface with a center of rotation, both of which are located on the outlet side of said annulus when said plug engages said annulus, said spherical contact surface attached to said sealing surface such that said sealing surface may rotate about said center of rotation;
   a support structure located on said inlet side of said annulus; and
   means to urge said spherical sealing surface of said plug into contact with said annulus, one end of said means attached to said support structure and the other end of said means in sliding engagement with said spherical contact surface of said plug.

3. The valve assembly of claim 2 wherein said means to urge said spherical sealing surface of said plug into contact with said annulus includes telescoping tubes and a compressible helical spring in axial alignment with said tubes biasing said spherical sealing surface of said plug into contact with said annulus.

4. In a waste storage tank having an annulus defining a drain hole in the bottom of the tank, said annulus having an inlet and outlet sides, a support structure located on said inlet side of said annulus, a valve plug, and extensive means attached to said support structure biasing said valve plug into the inlet side of said annulus, an improved plug comprising:
   a spherical sealing surface to engage the inlet side of said annulus to close said drain hole; and
   a spherical contact surface with a center of rotation, both of which are located on the outlet side of said annulus when said plug engages said annulus, said spherical contact surface attached to said sealing surface such that said sealing surface may rotate about said center of rotation, said spherical contact surface of said valve plug slidably engaging said extensible means for rotation about the center of rotation.

* * * * *